(12) United States Patent
Winter et al.

(10) Patent No.: US 10,726,271 B2
(45) Date of Patent: Jul. 28, 2020

(54) VIRTUAL TURNSTILE SYSTEM AND METHOD

(71) Applicant: Placemeter Inc., New York, NY (US)

(72) Inventors: Alexandre Winter, New York, NY (US); Ugo Jardonnet, New York, NY (US); Tuan Hue Thi, New York, NY (US); Niklaus Haldimann, New York, NY (US)

(73) Assignee: Placemeter, Inc., New York, NY (US)

( * ) Notice: Subject to any disclaimer, the term of this patent is extended or adjusted under 35 U.S.C. 154(b) by 0 days.

(21) Appl. No.: 16/020,676

(22) Filed: Jun. 27, 2018

(65) Prior Publication Data

US 2019/0251357 A1    Aug. 15, 2019

Related U.S. Application Data

(63) Continuation of application No. 15/078,611, filed on Mar. 23, 2016, now Pat. No. 10,043,078, which is a continuation-in-part of application No. 14/727,321, filed on Jun. 1, 2015.

(60) Provisional application No. 62/150,646, filed on Apr. 21, 2015.

(51) Int. Cl.
| G06K 9/00 | (2006.01) |
| G06K 9/62 | (2006.01) |
| G06T 7/246 | (2017.01) |
| G06T 7/194 | (2017.01) |

(52) U.S. Cl.
CPC ..... *G06K 9/00744* (2013.01); *G06K 9/00771* (2013.01); *G06K 9/6267* (2013.01); *G06T 7/194* (2017.01); *G06T 7/246* (2017.01); *G06T 2207/10016* (2013.01); *G06T 2207/30232* (2013.01); *G06T 2207/30241* (2013.01); *G06T 2207/30242* (2013.01)

(58) Field of Classification Search
CPC ............ G06K 9/00744; G06K 9/00771; G06T 7/194; G06T 7/246
See application file for complete search history.

(56) References Cited

U.S. PATENT DOCUMENTS

| 5,194,908 | A | 3/1993 | Lougheed |
| 6,295,321 | B1 | 9/2001 | Lyu |
| 6,587,574 | B1 | 7/2003 | Jeannin |
| 6,987,883 | B2 | 1/2006 | Lipton et al. |
| 6,999,600 | B2 | 2/2006 | Venetianer et al. |

(Continued)

FOREIGN PATENT DOCUMENTS

| CN | 101489121 A | 7/2009 |
| WO | 2015/184440 A2 | 12/2015 |

OTHER PUBLICATIONS

Machado, D., "People Counting System Using Existing Surveillance Video Camera" Nov. 2011, pp. 1-71.

(Continued)

*Primary Examiner* — Mia M Thomas
(74) *Attorney, Agent, or Firm* — Martensen IP (57) ABSTRACT

Embodiments include a system and method for activity monitoring using video data from multiple dissimilar sources. The video data is processed to remove any dependency of the system on types of video input data. The video data is processed to yield useful human readable information regarding events in real time, such as how many people move through a line in a period of time.

18 Claims, 5 Drawing Sheets

(56) References Cited

U.S. PATENT DOCUMENTS

| | | |
|---|---|---|
| 7,006,128 B2 | 2/2006 | Xie |
| 7,199,798 B1 | 4/2007 | Echigo |
| 7,221,367 B2 | 5/2007 | Cardno |
| 7,224,852 B2 | 5/2007 | Lipton et al. |
| 7,382,244 B1 | 6/2008 | Donovan |
| 7,391,907 B1 | 6/2008 | Venetianer et al. |
| 7,424,175 B2 | 9/2008 | Lipton et al. |
| 7,574,043 B2 | 8/2009 | Porkili |
| 7,613,322 B2 | 11/2009 | Yin et al. |
| 7,688,349 B2 | 3/2010 | Flickner et al. |
| 7,796,780 B2 | 9/2010 | Lipton et al. |
| 7,801,330 B2 | 9/2010 | Zhang et al. |
| 7,868,912 B2 | 1/2011 | Venetianer et al. |
| 7,932,923 B2 | 4/2011 | Lipton et al. |
| 8,325,036 B1 | 12/2012 | Fuhr |
| 8,331,619 B2 | 12/2012 | Ikenoue |
| 8,340,349 B2 | 12/2012 | Salgian |
| 8,340,654 B2 | 12/2012 | Bratton et al. |
| 8,369,399 B2 | 2/2013 | Egnal et al. |
| 8,401,229 B2 | 3/2013 | Hassan-Shafique et al. |
| 8,457,401 B2 | 6/2013 | Lipton et al. |
| 8,526,678 B2 | 9/2013 | Liu et al. |
| 8,564,661 B2 | 10/2013 | Lipton et al. |
| 8,582,803 B2 | 11/2013 | Ding |
| 8,594,482 B2 | 11/2013 | Fan |
| 8,599,266 B2 | 12/2013 | Trivedi |
| 8,625,905 B2 | 1/2014 | Schmidt |
| 8,649,594 B1 | 2/2014 | Hua |
| 8,654,197 B2 | 2/2014 | Nizko |
| 8,655,016 B2 | 2/2014 | Brown |
| 8,711,217 B2 | 4/2014 | Venetianer et al. |
| 8,823,804 B2 | 9/2014 | Haering et al. |
| 8,948,458 B2 | 2/2015 | Hassan-Shafique et al. |
| 9,213,781 B1 | 12/2015 | Winter |
| 10,043,078 B2* | 8/2018 | Winter ............... G06T 7/194 |
| 2002/0051057 A1 | 5/2002 | Yata |
| 2002/0124263 A1 | 9/2002 | Yokomizo |
| 2003/0053692 A1* | 3/2003 | Hong ............... H04N 19/23 |
| | | 382/171 |
| 2003/0090751 A1 | 5/2003 | Itokawa |
| 2003/0215110 A1 | 11/2003 | Rhoads |
| 2004/0022227 A1 | 2/2004 | Lynch |
| 2004/0151342 A1 | 8/2004 | Venetianer |
| 2004/0161133 A1 | 8/2004 | Elazar |
| 2005/0169531 A1 | 8/2005 | Fan |
| 2005/0185058 A1 | 8/2005 | Sablak |
| 2005/0213836 A1 | 9/2005 | Hamilton |
| 2006/0007308 A1 | 1/2006 | Ide |
| 2006/0031291 A1 | 2/2006 | Beckemeyer |
| 2006/0078047 A1 | 4/2006 | Shu |
| 2006/0095539 A1 | 5/2006 | Renkis |
| 2006/0198608 A1 | 9/2006 | Girardi |
| 2006/0227862 A1 | 10/2006 | Campbell |
| 2006/0233535 A1 | 10/2006 | Honda |
| 2006/0290779 A1 | 12/2006 | Reverte |
| 2007/0024705 A1 | 2/2007 | Richter |
| 2007/0024706 A1 | 2/2007 | Brannon |
| 2007/0071403 A1 | 3/2007 | Urita |
| 2007/0016345 A1 | 5/2007 | Peterson |
| 2007/0127508 A1 | 6/2007 | Bahr |
| 2007/0127774 A1 | 6/2007 | Zhang |
| 2007/0147690 A1 | 6/2007 | Ishiwata |
| 2007/0177792 A1 | 8/2007 | Ma |
| 2008/0030429 A1 | 2/2008 | Hailpern |
| 2008/0123955 A1 | 5/2008 | Yeh |
| 2008/0137950 A1 | 6/2008 | Park |
| 2008/0152122 A1 | 6/2008 | Idan |
| 2008/0263012 A1* | 10/2008 | Jones ............... G06K 9/00711 |
| 2008/0281518 A1 | 11/2008 | Dozier |
| 2008/0316327 A1 | 12/2008 | Steinberg |
| 2008/0316328 A1 | 12/2008 | Steinberg |
| 2009/0033745 A1 | 2/2009 | Yeredor |
| 2009/0034846 A1 | 2/2009 | Senior |
| 2009/0063205 A1 | 3/2009 | Shibasaki |
| 2009/0080864 A1 | 3/2009 | Rajakarunanayake |
| 2009/0103812 A1 | 4/2009 | Diggins |
| 2009/0141939 A1 | 6/2009 | Chambers |
| 2009/0147991 A1 | 6/2009 | Chau |
| 2009/0222388 A1 | 9/2009 | Hua |
| 2009/0245573 A1* | 10/2009 | Saptharishi ............ G06T 7/246 |
| | | 382/103 |
| 2009/0268968 A1 | 10/2009 | Milov |
| 2009/0290023 A1 | 11/2009 | Lefort |
| 2010/0014717 A1 | 1/2010 | Rosenkrantz |
| 2010/0142927 A1 | 6/2010 | Lim |
| 2010/0177194 A1 | 7/2010 | Huang |
| 2010/0211304 A1 | 8/2010 | Hwang |
| 2010/0260385 A1 | 10/2010 | Chau |
| 2010/0290710 A1 | 11/2010 | Gagvani |
| 2010/0295999 A1* | 11/2010 | Li ........................ G06F 3/1446 |
| | | 348/705 |
| 2010/0302346 A1 | 12/2010 | Huang |
| 2011/0007944 A1 | 1/2011 | Atrazhev |
| 2011/0018998 A1 | 1/2011 | Guzik |
| 2011/0125593 A1 | 5/2011 | Wright |
| 2011/0130905 A1 | 6/2011 | Mayer |
| 2011/0141227 A1 | 6/2011 | Bigiol |
| 2011/0152645 A1 | 6/2011 | Hoover |
| 2011/0153645 A1 | 6/2011 | Hoover |
| 2011/0184307 A1 | 7/2011 | Hulin |
| 2011/0280547 A1 | 11/2011 | Fan |
| 2011/0310970 A1 | 12/2011 | Lee |
| 2012/0008819 A1* | 1/2012 | Ding ................. G06K 9/00771 |
| | | 382/100 |
| 2012/0057640 A1 | 3/2012 | Shi |
| 2012/0075450 A1* | 3/2012 | Ding ................. G06K 9/00335 |
| | | 348/77 |
| 2012/0086568 A1 | 4/2012 | Scott |
| 2012/0106782 A1* | 5/2012 | Nathan ............. G06K 9/00771 |
| | | 382/103 |
| 2012/0127262 A1 | 5/2012 | Wu |
| 2012/0134535 A1 | 5/2012 | Pai |
| 2012/0179832 A1 | 7/2012 | Dolph |
| 2012/0182392 A1 | 7/2012 | Kearns |
| 2012/0262583 A1* | 10/2012 | Bernal ................. G08B 13/196 |
| | | 348/164 |
| 2012/0304805 A1 | 11/2012 | Kim |
| 2013/0058537 A1 | 3/2013 | Chertok |
| 2013/0086389 A1 | 4/2013 | Suwald |
| 2013/0148848 A1 | 6/2013 | Lee |
| 2013/0166711 A1 | 6/2013 | Wang |
| 2013/0202165 A1 | 8/2013 | Wehnes |
| 2013/0251216 A1 | 9/2013 | Smowton |
| 2014/0003708 A1 | 1/2014 | Datta |
| 2014/0015846 A1 | 1/2014 | Campbell |
| 2014/0036090 A1 | 2/2014 | Black |
| 2014/0046588 A1* | 2/2014 | Maezawa ............... G01C 22/00 |
| | | 701/487 |
| 2014/0052640 A1 | 2/2014 | Pitroda |
| 2014/0129596 A1 | 5/2014 | Howe |
| 2014/0132728 A1* | 5/2014 | Verano ............. G06K 9/00771 |
| | | 348/46 |
| 2014/0212002 A1 | 7/2014 | Curcio |
| 2014/0278068 A1 | 9/2014 | Stompolos |
| 2014/0294078 A1 | 10/2014 | Seregin |
| 2014/0307056 A1 | 10/2014 | Collet |
| 2014/0359576 A1 | 12/2014 | Rath |
| 2015/0006263 A1 | 1/2015 | Heier |
| 2015/0046127 A1 | 2/2015 | Chen |
| 2015/0070506 A1 | 3/2015 | Chattapadhyay |
| 2015/0077218 A1 | 3/2015 | Chakkaew |
| 2015/0138332 A1 | 5/2015 | Cheng |
| 2015/0227774 A1 | 8/2015 | Balch |
| 2015/0339532 A1 | 11/2015 | Sharma |
| 2015/0348398 A1 | 12/2015 | Williamson |
| 2015/0350608 A1 | 12/2015 | Winter |
| 2016/0012465 A1 | 1/2016 | Sharp |
| 2016/0019427 A1 | 1/2016 | Martin |
| 2016/0088222 A1 | 3/2016 | Jenny |
| 2016/0314353 A1* | 10/2016 | Winter ............... G06K 9/00744 |
| 2016/0334927 A1 | 11/2016 | Kim |
| 2017/0068858 A1 | 3/2017 | Winter |
| 2017/0070707 A1* | 3/2017 | Winter ............... H04N 7/188 |

(56) References Cited

U.S. PATENT DOCUMENTS

| | | | |
|---|---|---|---|
| 2017/0277956 A1* | 9/2017 | Winter | H04N 7/188 |
| 2017/0277959 A1* | 9/2017 | Winter | H04N 7/188 |
| 2018/0046315 A1 | 2/2018 | Kim | |
| 2018/0165813 A1 | 6/2018 | Mai | |
| 2019/0251357 A1* | 8/2019 | Winter | G06K 9/00744 |

OTHER PUBLICATIONS

Lefloch, D., "Real-Time People Counting System Using Video Camera" Master of Computer Science, Image and Artificial Intelligence 2007 at UFR Sciences et Technique, pp. 1-5.

Terada, K., "A Method of Counting the Passing People by Using the Stereo Images" Image Processing, 1999, ICIP 99. Proceedings. 1999 International Confenerence, pp. 1-5.

Bannour, H. et al., "Survey of the Adequate Descriptor for Content-Based Image Retrieval on the Web" Global versus Local Features, Department of Information Sciences.

Lisin, D. et al., "Combining Local and Global Image Features for Object Class Recognition" Computer Vision Lab, Department of Computer Science, University of Massachusetts.

Paninski, L., "Estimation of Entropy and Mutual Information" Center for Neural Science, New York University, New York, NY 10003, USA, Accepted Nov. 27, 2002.

Makris et al., "Learning Semantic Scene Models From Observing Activity in Visual Surveillance" Jun. 2005, IEEE, Trans. on Systems, Man, and Cybernetics—part B: Cybernetics, vol. 35, No. 3, p. 397-408.

Estevez-Ayres et al., "Using Android Smartphones in a Service-Oriented Video Surveillance System", Jan. 2011, IEEE Int. Conf. on Consumer Electronics, 2011, p. 887-888.

Parameswaran et al., "Design and Validation of a System for People Queue Statistics Estimation", Jan. 2012, Springer, Video Analytics for Business Intelligence, ;. 355-373.

Foresti et al., "Event Classification for Automatic Visual-Based Surveillance of Parking Lots", Aug. 2004, IEEE, Proceedings of the 17th Int. Conf. on Pattern Recognition, p. 1-4.

Yang et al., "Multi-Target Tracking by Online Learning of Non-Linear Motion Patterns and Robust Appearance Models", Jun. 2012, IEEE, 2012 IEEE Conf. on Computer Vision and Pattern Recognition, p. 1918-1925.

Magee, "Tracking Multiple Vehicle Using Foreground, Background and Motion Models", Feb. 2004, Elsevier, Image and Vision Computing, vol. 22, issue 2, p. 143-155.

Morris et al., "A Survey of Vision-Based Trajectory Learning and Analysis for Surveillance", Aug. 2008, IEEE, IEEE Transactions on Circuits and Systems for Video Technology, vol. 18, No. 8, p. 1114-1127.

Stauffer et al., "Adaptive Background Mixture Models for Real-Time Tracking", Jun. 1999, IEEE, 1999 IEEE Computer Society Conference on Computer Vision and Pattern Recognition Proceedings, p. 246-252.

Xu et al., "Partial Observation vs. Blind Tracking through Occlusion", Jan. 2003, British Machine Vision Conference (BMVC 2002), p. 777-786.

Virtual Turnstile | Security Systems Technology | www.sstgroup.co.uk/solutions/access-control/virtual-turnstile pp. 1-2.

Amended Claims of Related U.S. Appl. No. 15/288,085, submitted Jun. 13, 2018.

Amended Claims of Related U.S. Appl. No. 15/288,224, submitted May 9, 2018.

Placemeter Inc., PCT/US2015/033499 Application, "Notification of Transmittal of the International Search Report and the Written Opinion", dated Oct. 28, 2015.

Placemeter Inc., PCT/US2016/025816 Application, "Notification Concerning Transmittal of International Preliminary Report on Patentability", dated Nov. 2, 2017.

Placemeter Inc., PCT/US2016/025816 Application, "Notification of Transmittal of the International Search Report and the Written Opinion", dated Jul. 11, 201.

Placemeter Inc., PCT/US2016/028511 Application, "Notification Concerning Transmittal of International Preliminary Report on Patentability", dated Nov. 2, 2017.

Placemeter Inc., PCT/US2016/028511 Application, "Notification of Transmittal of the International Search Report and the Written Opinion", dated Sep. 14, 2016.

Placemeter Inc., EP 15798996.3 Application, "Communication Pursuant to Rule 164(1) EPC—Partial Supplementary European Search Report", dated Nov. 27, 2017.

Placemeter Inc., EP 15798996.3 Application, "Communication—Extended European Search Report", dated Feb. 6, 2018.

Baudrier, E. et al., "A Fast Binary-Image Comparison Method with Local-Dissimilarity Quantification", Laboratory Crestic, Troyes Cedex, France.

Almomani, R., et al., "Segtrack: A Novel Tracking System with Improved Object Segmentation", IEEE 2013, Wayne State University, Department of Computer Science, Detroit, MI 48202, ICIP 2013, p. 3939-3943.

Lucas, B., et al., "An Iterative Image Registration Technique with an Application to Stereo Vision", Proceedings of Imaging Understanding Workshop 1981, Computer Science Department, Carnegie-Mellon University, p. 121-130.

Russakoff, D., et al., "Image Similarity Using Mutual Information of Regions", Dept. of Computer Science, Stanford University, ECCV 2004, LNCS 3023, Springer-Verlag, Berlin Heidelberg 2004, pp. 596-607.

Shi, J., et al., "Good Features to Track", IEEE Conference on Computer Vision and Pattern Recognition (CVPR94), Seattle, Jun. 1994.

Studholme, C., et al., "An Overlap Invariant Entropy Measure of 3D Medical Image Alignment", 1999 Pattern Recognition Society, Published by Elsevier Sciences Ltd., Pattern Recognition 31 (1999), p. 71-86.

Viola, P., et al., "Robuts Real-Time Face Detection", 2004 International Journal of Computer Vision 57(2), Kluwer Academic Publishers, Netherlands, p. 137-154.

"Virtual Turnstile" Security Systems Technology Ltd 2008 pp. 1-2.

Borges, "Pedestrian Detection Based on Blob Motion Statistics", Feb. 2013, IEEE, IEEE Trans. on Circuits and Systems for Video Technology, vol. 23, No. 2, pp. 224-235 (Year 2013).

Miller, "Supervised Learning and Bayesian Classification", Sep. 2011, University of Massachusetts Amherst, CS370; Introduction of Computer Vision (<https://people.cs.umass.edu/~elm/Teaching/370_511/>), <https://people.cs.umass.edu/~elm/Teaching/Docs/supervised.pdf> , p. 1-8 (Year 2011).

Franconeri et al., "A simple proximity heuristic allows tracking of multiple objects through occlusion", Jan. 2012, Psychonomic Society, Attention, Perception & Psychophysics, vol. 74, issue 4, pp. 691-702 (Year 2012).

Stephen et al., "A visual tracking system for the measurement of dynamic structural displacements", Aug. 1991, Wiley, Concurrency and Computation: Practice and Experience, vol. 3, issue 4, pp. 357-366 (Year 1991).

* cited by examiner

VIRTUAL TURNSTILE SYSTEM AND METHOD

RELATED APPLICATIONS

This is a continuation of U.S. patent Ser. No. 15/078,611, filed Mar. 23, 2016. U.S. patent Ser. No. 15/078,611 application claims priority from U.S. Provisional Application No. 62/150,646, filed Apr. 21, 2015. This application is also a continuation-in-part of U.S. patent application Ser. No. 14/727,321, filed Jun. 1, 2015, which claims priority from U.S. Provisional Application No. 62/005,815, filed May 30, 2014. All the foregoing patent applications are incorporated by reference herein in their entirety.

FIELD OF THE INVENTION

Embodiments disclosed herein are in the field of video data processing, in particular object detection.

BACKGROUND

Video cameras have been used to capture video images for various applications such as surveillance, machine vision, security monitoring, inspection, sensing and detection. Digital video data is processed using various computer-implemented techniques to extract useful information or to alter the video data itself. The digital video data may be sent to a nearby or remote image processing device to be processed and displayed. As the number of digital image sources increases (surveillance cameras, cell phone cameras, etc.) more capable and efficient techniques for extracting information regarding the world in near real-time are desirable.

DETAILED DESCRIPTION

Embodiments described herein include a system and method for video data processing. Video data from multiple streaming sources is processed in order to determine the status of various aspects of environments. The video data processing system uses video streams to measure activity levels in the physical world. This provides information that enables people and businesses to interact more effectively and efficiently with physical locations and cities.

In an embodiment, the video data processing system uses input video streams from a variety of sources. Sources include existing video feeds such as security cameras, video feeds contributed by system users through old smartphones placed in a fixed location simple webcams, or embedded sensors that contain a video feed and some video analysis software. The system includes a backend subsystem consisting of specially programmed processors executing software that manages video feeds, processes the video feeds into data, stores the data, and computes analytics and predictions.

Embodiments facilitate the processing and analysis of any possible video source, whatever its type or support. These sources include: existing public video cameras in the form of standard video streams; existing public video feeds in the form of .jpg files regularly updated on a website; simple webcams; security cameras installed for security purposes but whose feeds can be ingested by the video data processing system to extract data; video streams or files coming from old cell phones that run a video sensing application specific to the video data processing system. The sensing application can either produce actual video streams or encore video files, and pushes them on a hosted storage server such as FTP server or Amazon S3 server. Using a smartphone as a video sensor, a capture device is configured to stream data out through files. This solves a major problem of setting cameras and exporting their feeds to a different network location on the internet.

The system thus provides a unified framework to intake video frames coming from these various described sources, and to unify their geolocation and time reference so as to be able to compare any geolocated or time stamped data extracted from them.

In an embodiment using a smart phone, consecutive video files on the smartphone are encoded, time stamped, and pushed to an FTP server to produce a stable stream of video content without having to have a video streaming server in the loop, but rather a simple file server.

These video feeds are produced by multiple types of entities, including: companies or entities that own video feeds, and provide them for free—e.g. the DOT in New York; companies or entities (e.g. retailers) that own video feeds, and provide them to the video data processing system in exchange for having them transformed into valuable data; companies or organizations that are paid for access to the video feeds they own and operate—e.g. earthcam; companies with whom there is no monetary exchange, e.g. they provide their feed, in exchange for a minimal amount of data for free; and individual contributors who use old smart phones or contribute old cell phones which are hung on windows or wall surface. By running the sensing application on these old phones, new video data processing system video feeds are created.

Compiling video data from many different sources to create data insights and analytics has more scaling network effect than all single data sources combined. This is made possible in part by aggregating data from multiple sources (including individual contributors) into a combined, stable source.

Embodiments include various video algorithms dedicated to transforming a video signal into data and measurements. Embodiments further include data algorithms that combine measurements from video feeds with lower resolution activity maps, weather information, and local event data, to infer place activity in space and time. An output interface includes tools to turn the data extracted from videos into human readable information and useful actions.

Figure 1:
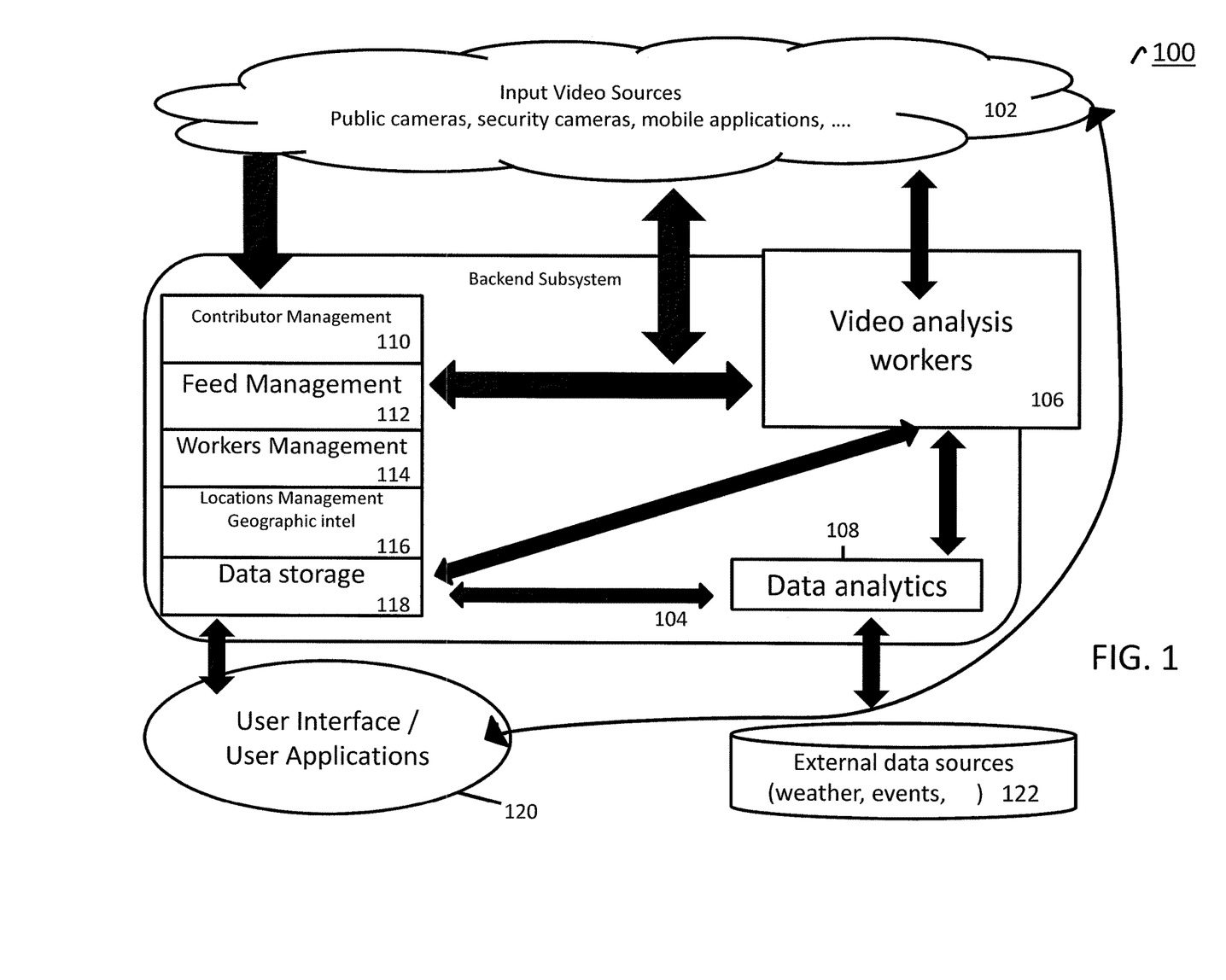
FIG. 1 is a block diagram of a video data processing system according to an embodiment.

FIG. 1 is a block diagram of a video data processing system architecture 100 according to an embodiment. Input video sources 102 can include public cameras, security cameras, mobile applications, and any other device capable of capturing digital video streams. This includes a proprietary protocol to do continuous streaming over long periods of time. A feedback loop is used to reconstruct data, and to identify and solve bandwidth issues.

The input video sources 102 are very varied in nature and quality as previously described. A backend subsystem 104 receives video data streams from the input video sources 102. Feed management module 112 receives the video data streams. Other management modules include a worker management module 114, a locations management and geographic intelligence module 116, and a data storage module 118. As used herein, "worker" implies one or more servers and one or more processors for processing data. Workers can be distributed geographically, and processing tasks may be distributed among workers in any fashion. Data storage module 118 is shown as a single module existing in backend 104. However, actual data storage can be, and typically is, distributed anywhere over the internet. Data storage module 118 is thus a data management module and possibly actual data storage, but not all data will be stored locally.

Input video sources 102 also communicate with a contributor management module 110. Contributor management module 110 oversees and tracks the various input video sources, including their locations and "owners". In some instances, individual owners are paid for making their video data available to the system. Video analysis workers 106 represent multiple special purpose processors tasked with executing video analysis worker processes as further described below. Analyzed video data is stored by data storage manager 118, and also further analyzed by data analytics module 108 as further described below. Data analytics module 108 represents special purpose processors executing data analytics processes. Data analytics module 108 further has access to external data sources 122, which provide data such as weather information, event information related to a location of the video data, etc. Data analytics module 108 may combine external data with the output of the video analysis workers 106 to produce more meaningful output data that is stored by data storage management 118 and output to user interface and user applications 120. User interface and applications 120 make processed video data available to users in a highly accessible form. User interface 120 is available in various embodiments on any computing device with processing capability, communication capability, and display capability, including personal computers and mobile devices.

In an embodiment, backend 104 is a multi-layered system whose roles include: registering all existing video streams and their sources; if the source is a contributor, storing availability and contact information to provide data or to pay them, based on the availability of their sensors; managing "worker" processes that process all video feeds in a different subsystem, and will report data to backend 104; gathering and storing data extracted from video streams; consolidating and merging all data from various sources (e.g., video measurements, weather APIs); packaging and serving data for applications or as an output of backend 104; and architecturally removing the dependency of the video algorithm processor on the various sources of data.

Figure 1A:
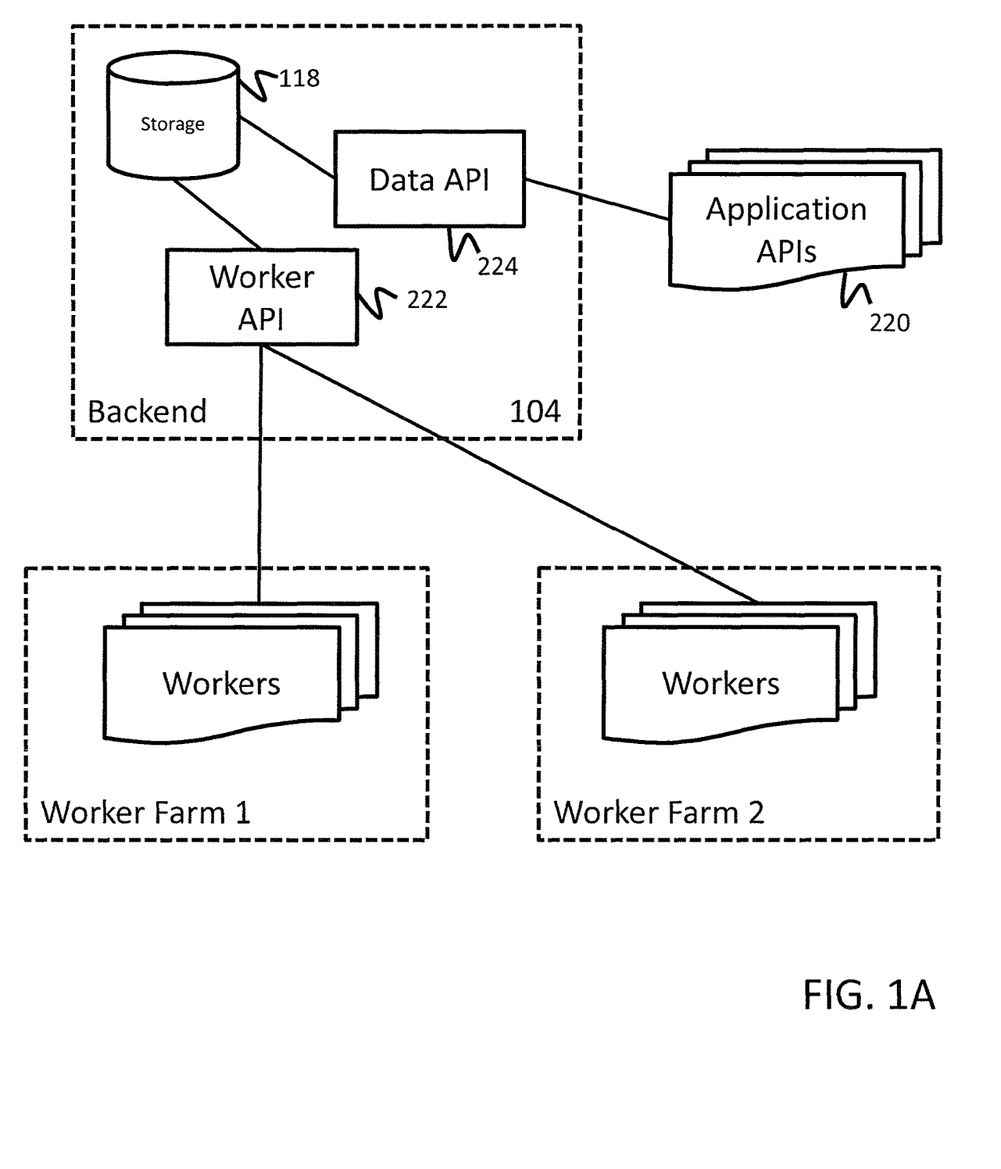
FIG. 1A is a block diagram of components of the video data processing system according to an embodiment.

According to one aspect of backend 104, it serves to coordinate the distribution of all input sources and worker processes over different types of networks and environments. FIG. 1A is a block diagram illustrating this concept. A worker application programming interface (API) 222 is defined for worker processes running on worker farms such as worker farm 1 and worker farm 2. Worker processes are software processes that can run on any operating system such as Linux, Mac OS or Windows with sufficient random access memory (RAM) and central processing unit (CPU) power to register with backend 104 over a Wide Area Network (WAN), assign individual video feeds with corresponding algorithm parameters and specifications, and then start processing that feed and reporting output data back to the same API 220 endpoint family. These worker processes also report on their level of activity, CPU and RAM occupancy, as well as availability. Thus the video data processing system can instantiate worker processes in many varied environments, leveraging available platforms that can contribute CPU power.

Various applications APIs 220 can be used to allow various applications to communicate data to data APIs 224.

The video data processing system executes various video algorithms and various data algorithms. In an embodiment, the video algorithms are based on a layered stack of algorithms. In an embodiment, these algorithmic layers are based on the assumption that video feeds have a static viewpoint and an average frame rate greater than 0.2 frames per seconds, but embodiments are not so limited.

Video Algorithms

Moving object detection is a layer that detects moving objects or moving parts in the image. It is based on estimating the background image of a fixed video stream, by modeling each point using a Gaussian distribution of values on each channel of a color image, or the amplitude of the combined channels. Each pixel is then modeled as: Gaussian distributions for all channels of the color image; and a Gaussian distribution for the pixel luminance expressed as a linear combination of the three color channels.

Such a model is created and stored in memory for each coordinate point of an image. As new frames arrive in the system, the Gaussian model estimation is updated with the new values of each pixel at the same coordinate by storing the sum S of the pixel values over time, and the sum T of squared values. Given the total number of observations is N, the average and standard deviation of the Gaussian model can then be evaluated as S/N for the mean value and (2S−S*S)/N for the square value of the standard deviation.

In order to adjust the Gaussian values to potential changes in the mean and standard deviation, these values are computed on moving time windows. In order to reduce the complexity of computing all values over a moving averages, a half distance overlapping scheme is used. If M is the minimum window size (number of samples) over which mean and standard deviation is to be estimated, two sets of overlapping sums and square sums are constantly stored: the current sum set and the future sum set. Each set has the number of samples and the sum of values and the sum of square values. When the first set reaches M samples, the second set is reset, and then updated with each new frame. When the first set reaches M*2 samples, the future set reaches M samples. The future set values are then copied into the current set values, and the future set is reset. This way, at any point in time after M first samples, the estimation of the Gaussian model always has more than M samples, and it is adjusted over time windows of M*2 samples. M is typically set to values ranging from 10 to 1000 depending on applications and video frame rates.

Once a new frame comes in, for each pixel location in an image, it is first assessed whether the current value is part of the background or not. To do so, the normalized distance of the current pixel values is computed for each color channel with the background mean values for each channel. The normalized distance is the distance of the current point to the closest mean adjusted with the standard deviation for the background images. This distance is then normalized towards the amplitude of each channel or the average of all channels. The raw distance calculated from above is divided by a uniform factor of the average values.

If this normalized distance is greater than a predefined threshold, the pixel is classified as a foreground pixel and assigned to the moving objects. If not, the pixel is deemed as part of the background, it is not assigned to front end masks but is used to update the current background models.

At any point in time, the algorithm assumes that there could be a rapid change in background, so it maintains a candidate background point. That point is either updated or created for each point detected as a foreground point.

If the image is too large, the image can be subsampled by an integer factor to evaluate a lower resolution version of the background. Also, the background statistics can be updated only once every n frames. This is very efficient to make the algorithm "real time" whatever the dimension or frame rate of a video. The CPU occupancy of such a process is controlled and defined with these two parameters. This is a unique way to linearly adjust algorithm reactivity and accuracy based on available or desired computation power.

The object classification layer classifies moving foreground objects (described with reference to the previous layer) into classes of known objects or "noise". In one embodiment, a customized version of the Haar Pyramid approach is used here. Once all moving objects have been detected, they are classified using a classic supervised learning approach, based on the Haar-like feature Cascade classification (as described in P. A. Viola, M. J. Jones: Robust Real-Time Face Detection. ICCV 2001).

According to embodiments, the system is trained and tested, and the algorithms run only on moving objects, thereby reducing the possibilities and variety of the training and input sets of images. In short the classification scheme only needs to distinguish moving urban objects from each other, as opposed to recognizing one type of object from any other possible matrix of pixels.

A tracking layer detects the trajectory of one given object over time. The system uses a novel approach based on a holistic model of the trajectories in the image based on existing known foreground objects or newly emerged objects.

An analysis layer uses the type and trajectory information to detect higher level, human readable data such as vehicle or pedestrian speed, and people entering or exiting a location. Inferences can also be drawn based on building layouts, vehicle traffic flows, and pedestrian traffic flows.

Figure 2:
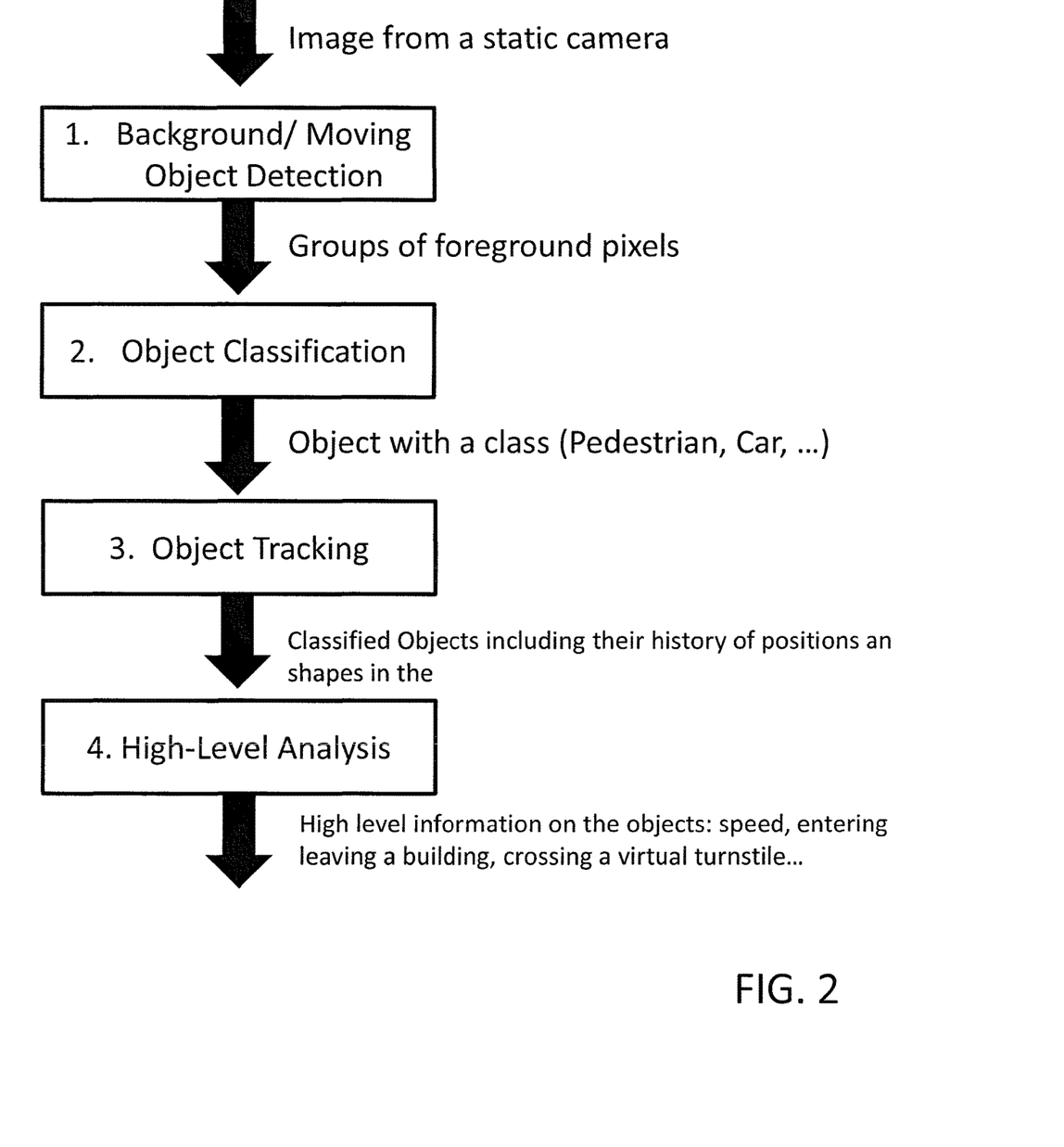
FIG. 2 is a flow diagram of a video data processing method according to an embodiment.

FIG. 2 is a flow diagram of a process of object detection, classification, object tracking and analysis according to an embodiment. With reference to FIG. 2, embodiments of video algorithms detect and track foreground objects from static cameras and infer high level information such as object count and speed in real-time. They are based on a four-layer stack: object detection, classification, tracking and analysis. These algorithmic layers are based on the assumption that video feeds have a mostly static viewpoint and a frame rate greater than 0.2 frames per second.

A background/moving object detection process (1) takes as input an image from a static camera. Process (1) outputs groups of foreground pixels and a dynamic model of the background.

A goal of this layer is to detect moving objects or moving parts in the image. It is based on estimating the background image of a fixed video stream, by modeling each point using a Gaussian distribution of values on each channel of a color image, or the amplitude of the combined channels. For color images, the value of each channel is modeled as a Gaussian distribution. The Gaussian model, defined by its 0 and 1 moment, or mean and variance, is created and stored in memory for each coordinate point of an image.

In order to determine if a pixel p is part of the background or foreground, we compute a normalized distance metric of a pixel to the background value as the linear combination of the normalized distance for each channel. A normalized distance for a channel is defined as the absolute distance from the pixel channel value to the background value, divided by its standard deviation.

$$d(i)=(v(i)-b(i))/\text{sigma}(i)$$

where (i) is the channel index, v the current pixel channel value, b the background channel value and sigma the current estimate of the background channel value standard deviation.

$$D=d(0)+d(1)+d(2) \text{ if the image is a 3 channel color image.}$$

As new frames arrive in the system, we first compute the normalized distance of this pixel to the current background Gaussian model. If the value is less than a first threshold T1, we consider the pixel as part of the background and update the Gaussian model for this coordinate point with the current pixel values.

If the value is greater than T1, we create a new model for a new background candidate. Things might have changed in the image and we need a new background candidate to adjust to these changes. If there are already some background candidates available, we first compute distances of the current pixels to other candidates. If any distance is less than T1, we update the best matching candidates (the one with the lowest distance) with the current value. If no match was found, we create a new candidate.

If a candidate was not updated for a given period of time S, we cancel the background candidate.

Each candidate has a lifetime span, that is equal to the time elapsed between its creation and its last update. The lifetime span cannot be greater than a parameter E called eternity.

$$LS=\text{MIN}(E,t(\text{updated})-t(\text{created})).$$

If any of the candidate backgrounds has a longer lifetime span than the current background, we cancel the current background value and replace it with the new, longer lifetime value. This helps the model adjust to rapid background changes.

If the distance metric is greater than a different factor T2, we mark the pixel as being part of the foreground.

In order to adjust the Gaussian values to potential changes in the mean and standard deviation, we estimate all Gaussian model values over overlapping time windows. In order to reduce the complexity of computing all values over moving averages, we use a half-overlapping scheme. If M is the minimum window size (number of samples) over which we want to estimate Gaussian models, we constantly store two sets of overlapping sums and square sums: the current sum set and the future sum set. Each set stores the number of samples and the sum of values and the sum of square values that help compute mean and variance. When the first set reaches M samples, we reset the second set and start updating it with each new frame. When the first set reaches M*2 samples, the future set reaches M samples. We then copy the future set values into the current set values, and reset the future set. This way, at any point in time after M first samples, we always have an estimation of the Gaussian model that has more than M samples, and adjust over time windows of M*2 samples. M is typically set to values ranging from 10 to 1000 depending on applications and video frame rates. As a result, outside of the starting period where we have less than M samples processed in total, all our Gaussian model estimates rely on at least M samples.

In order to reduce computation cost, we can subsample the image spatial reference by a factor P. Also, we can subsample the time reference by another factor Q—we update the background statistics only once every Q frames. This reduces the number of operations needed significantly. However, the foreground estimation cannot be subsampled, so complexity is only reduced for background estimation. This is very efficient to make the algorithm real time whatever the dimension or frame rate of a video. We actually control and define the CPU occupancy of a such a process with these two parameters. This is a unique way to linearly adjust algorithm reactivity and accuracy based on available or desired computation power.

An object pixel classification process (2) takes as input groups of foreground pixels. The output is one or more objects per group with an associated class.

The goal of this layer is to classify foreground described from process (1) above into classes of known objects or "noise". In an embodiment, a customized version of the ADABOOST Cascade approach is used.

Once we have detected all moving objects we classify them using a classic supervised learning approach, based on the ADABOOST Cascade classification (described in Viola and Jones P. A. Viola, M., and J. Jones: Robust Real-Time Face Detection. ICCV 2001).

Embodiments of the method train, test and run the algorithm only on moving objects, thereby reducing the possibilities and variety of the training and input sets of images. In short our classification scheme only needs to recognize moving urban objects from each other, as opposed to recognizing one type of object from any other possible matrix of pixels.

This step also helps separate groups or aggregates in some cases—if a car and pedestrians are close to each other and detected as the same object, we will be able to detect them separately in many occasions, thus splitting the original object in two separate objects.

An object tracking process (3) takes as input an instance of one object at one point in time, with or without associated class. The output is a linked appearance of the same objects at different times, with trajectory and shape over time.

The goal of this layer is to connect the occurrence of the same object in consecutive frames so as to understand the object's movement in the image.

At each new frame, we try to match new foreground objects with existing, connected objects tracked in prior iterations, or if no match is found, we create a new object. We use a combination of shape, predicted position based on previous motion, and pixel content, to do the matching.

An object trajectory analysis and classification process (4) takes as input objects with trajectories, and outputs high level information on objects.

The goal of this layer is to use the type and trajectory information to detect higher level, human readable data such as vehicle or pedestrian speed, and people entering or exiting a location. We can also infer on the building layouts based on traffic flows of pedestrians and vehicles.

Data Algorithm: Virtual Turnstile

Figure 3:
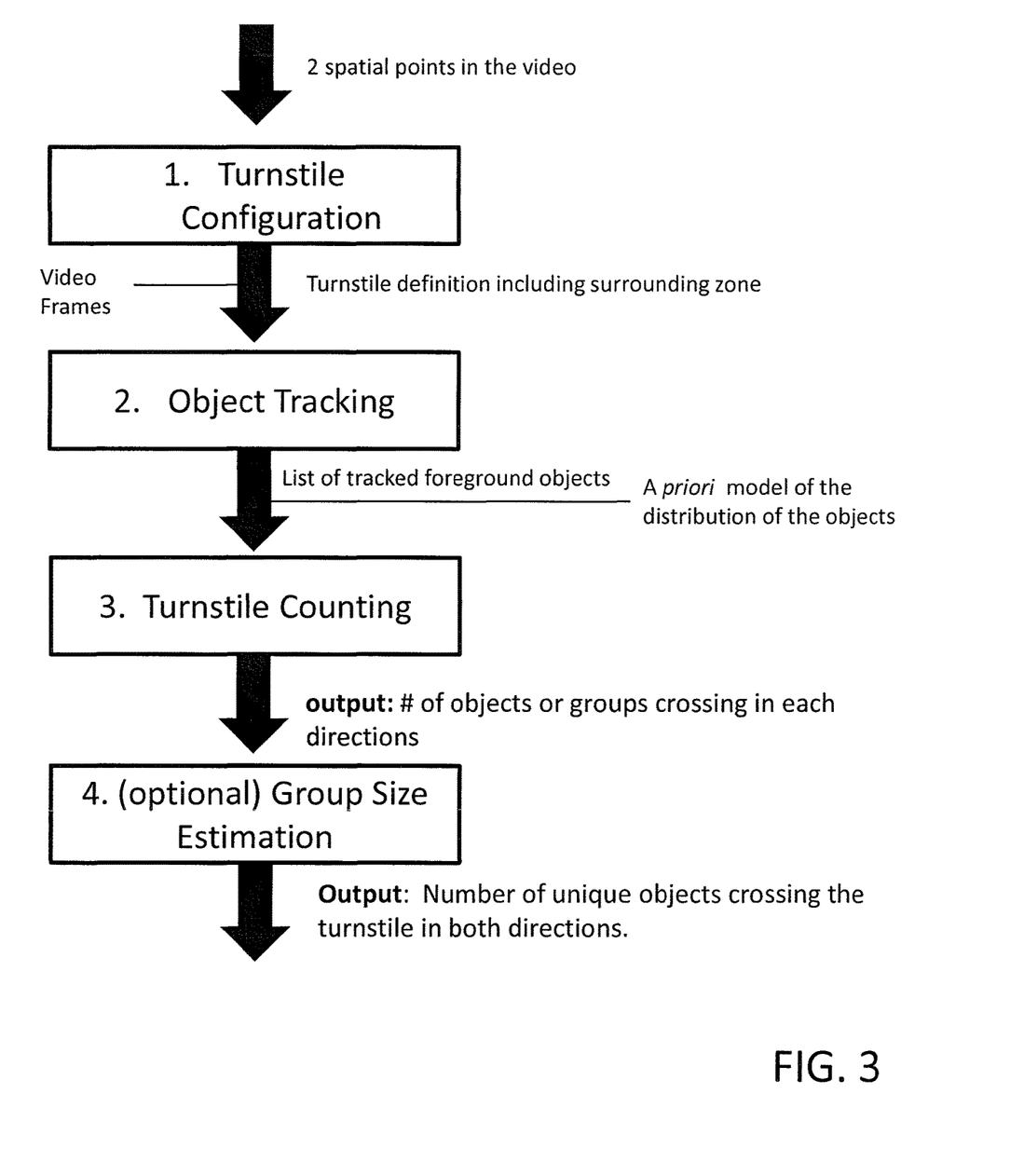
FIG. 3 is a flow diagram of a method for processing output of a video data processing method according to an embodiment

FIG. 3 is a flow diagram of a virtual turnstile method according to an embodiment. The virtual turnstile can be visualized as a fictive line segment materialized by two spatial points in a video.

The virtual turnstile counter is an algorithm that counts the number of objects (people, cars, etc.) crossing a virtual line drawn on a video, possibly breaking down these counts by object classes (color, kind, male, female, young, old . . . ) or any other information related to these objects.

Turnstile configuration (1) is defining the line where we want to count people, that is two points materializing this line in the video—manually entered or automatically deduced by the Scene Analysis algorithm. We limit the computation and detection of moving objects to a mask surrounding the turnstile, and as wide as the turnstile width. We also define a main crossing angle, which is the average angle objects are expected to cross the turnstile with. Then we define the maximum tolerated deviation to this angle: if an object crosses the turnstile with an angle that is different from the main angle to an extent larger than the maximum deviation, the object will be discarded.

Object detection and tracking (2) is as described with reference to FIG. 2.

The turnstile definition, including the surrounding zone, is input to the object tracking module (2). Output of the module is input to the turnstile counting or trajectory analysis module (3). This includes a count of objects crossing the virtual turnstile in the right conditions. This layer computes the crossing angle of the object to the turnstile and compares it to the angles definitions of the turnstile. In order to remove noise, this layer also removes any object whose trajectory is too erratic, e.g., where the virtual force to change trajectory is too large. Staring from Newton's equation:

$$(\text{sum of forces}) = (\text{acceleration}) \times (\text{mass of object})$$

Mass as a function of object surface is estimated. If the norm of the acceleration multiplied by the average surface of an object over time is higher than a threshold T, we discard the object. This threshold is estimated by computing all forces over some time over one image, and selecting the 99 percentile of this distribution.

Group size estimation (4) is optional. A group of N people walking together could be detected as one single blob, and in the algorithm presented so far, would simply be counted as one, and not N. One approach is to compute the median size of a person, and then use that to estimate the number of persons present in a blob. In an embodiment, the algorithm self-calibrates in a first step, assessing the average dimension of a person. To do this it registers all the sizes of moving objects crossing the threshold. It assumes they are mostly people. It also assumes that at least a given percentage N of them are not merged into groups. If we order all sizes, the N*tot_elements/100 element represents the typical person size. We use this to infer how many people are in a blob that crosses the line. We assume that there is always a certain overlap between people and factor that in the regression function to go from number of pixels in the blog to # persons in the blog. Another approach is to use a ground truth approach to adjust parameters and have a linear per part regression function: we design a liner-per-part model (a set of connected segments) as the function f(x)=n where x is the # pixels and n the estimated number of people. We use a linear regression to start, and then split the set in two subsets where the samples are divided by two, and iterate until reaching the desired number of segments of typically 8. In low quality video footage, it is sometimes impossible to distinguish individual people, so tracking waiting persons to know the time that it takes to travel the whole line is usually not viable. Instead, this approach to estimating the average wait time consists in dividing the line length by the average line speed. The line speed is estimated by computing the optical flow of a set of salient points into the line contours over each pair of consecutive frames.

Figure 4:
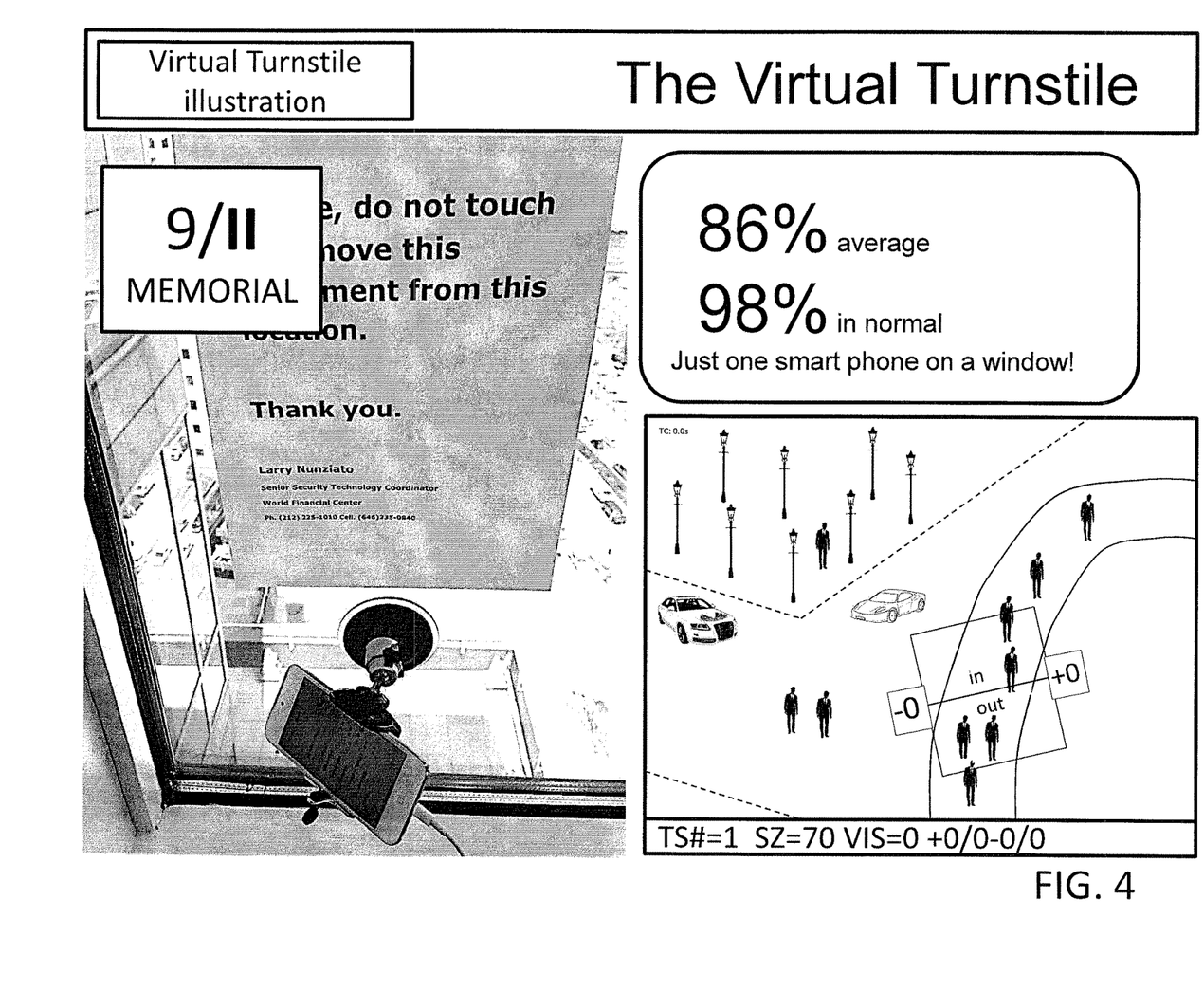
FIG. 4 is a diagram illustrating a virtual turnstile according to an embodiment.

This methodology was tested on views of the 9-11 Memorial Park in NYC captured by one smart phone camera, as shown in FIG. 4. Accuracies up to 98% were under normal conditions. Under average conditions accuracy reaches 86%.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. For example, while only one aspect of the systems and methods may be recited as embodied in machine-readable medium, other aspects may likewise be embodied in machine-readable medium. Accordingly, the inventors reserve the right to add additional claims after filing the application to pursue such additional claim forms for other aspects of the systems and methods.

What is claimed is:

1. A method for activity monitoring using video data, the method comprising:
 a special purpose processor collecting video data from a plurality of dissimilar sources;
 the special purpose processor, in an iterative process, defining known foreground objects and newly emerged objects;
 the special purpose processor determining moving objects from the video data;
 the special purpose processor classifying the moving objects from the video data;
 the special purpose processor tracking the moving objects from the video data wherein tracking comprises receiving as input an instance of one object at one point in time and calculating its trajectory and shape over time, and for each new video frame attempting to match foreground objects with existing objects tracked in prior iterations of the iterative process;
 the special purpose processor processing the video data from the plurality of dissimilar sources to allow the video data from the plurality of dissimilar sources to be analyzed without dependence on a source of any of the video data;
 wherein tracking the moving objects comprises tracking moving objects from a plurality the dissimilar sources to allow the video data from the plurality of dissimilar sources to be analyzed without dependence on a source of any of the video data; and
 a data analytics module configured to receive processed video data from the plurality of video analysis workers and output human readable information, wherein the human readable information comprises virtual turnstile information.

2. The method of claim 1, wherein the video data comprises a plurality of images, and wherein the image data is subsampled by an integer factor to facilitate processing speed.

3. The method of claim 1, wherein the video data comprises a plurality of images, and wherein determining moving objects comprises determining background statistics, wherein background statistics can be updated at variable intervals to affect different processing speeds.

4. The method of claim 1, wherein determining moving objects from the video data comprises estimating the background image of a fixed video stream, comprising modeling points in the video data using a Gaussian distribution of values on each channel of a color image.

5. The method of claim 1, wherein classifying moving objects comprises receiving groups of foreground pixels and outputting one or more objects per group with an associated class using class supervised learning.

6. The method of claim 1, wherein tracking the moving objects comprises receiving an instance of an object at a point in time and outputting a linked appearance of the same object at different times, with trajectory and shape over time.

7. The method of claim 1, wherein analyzing the video data comprises receiving objects with trajectories and outputting information regarding the objects, comprising speed, of objects, objects entering or leaving a location, and inference of building layouts based on movement of objects.

8. A non-transient computer readable medium having stored thereon instructions, that when executed by a special purpose processor cause a method for activity monitoring using video data to be performed, the method comprising:
the special purpose processor collecting video data from a plurality of dissimilar sources;
the special purpose processor, in an iterative process, defining known foreground objects and newly emerged objects;
the special purpose processor determining moving objects from the video data;
the special purpose processor classifying the moving objects from the video data;
the special purpose processor tracking the moving objects from the video data, wherein tracking comprises receiving as input an instance of one object at one point in time and calculating its trajectory and shape over time, and for each new video frame attempting to match foreground objects with existing objects tracked in prior iterations of the iterative process; and
the special purpose processor processing the video data from the plurality of dissimilar sources to allow the video data from the plurality of dissimilar sources to be analyzed without dependence on a source of any of the video data;
wherein tracking the moving objects comprises tracking moving objects from a plurality the dissimilar sources to allow the video data from the plurality of dissimilar sources to be analyzed without dependence on a source of any of the video data; and
a data analytics module configured to receive processed video data from the plurality of video analysis workers and output human readable information, wherein the human readable information comprises virtual turnstile information.

9. The non-transient computer readable medium of claim 8, wherein the video data comprises a plurality of images, and wherein the image data is subsampled by an integer factor to facilitate processing speed.

10. The non-transient computer readable medium of claim 9, wherein the video data comprises a plurality of images, and wherein determining moving objects comprises determining background statistics, wherein background statistics can be updated at variable intervals to affect different processing speeds.

11. The non-transient computer readable medium of claim 9, wherein determining moving objects from the video data comprises estimating the background image of a fixed video stream, comprising modeling points in the video data using a Gaussian distribution of values on each channel of a color image.

12. The non-transient computer readable medium of claim 9, wherein classifying moving objects comprises receiving groups of foreground pixels and outputting one or more objects per group with an associated class using class supervised learning.

13. The non-transient computer readable medium of claim 9, wherein tracking the moving objects comprises receiving an instance of an object at a point in time and outputting a inked appearance of the same object at different times, with trajectory and shape over time.

14. The non-transient computer readable medium of claim 9, wherein analyzing the video data comprises receiving objects with trajectories and outputting information regarding the objects, comprising speed, of objects, objects entering or leaving a location, and inference of building layouts based on movement of objects.

15. A system for processing multiple video data streams, comprising:
a plurality of input video data sources;
a backend subsystem configured to receive video data from the plurality of input video data sources, the backend subsystem comprising,
a plurality of video analysis workers comprising special purpose processors tasked with executing video analysis worker processes, comprising,
in an iterative process, defining known foreground objects and newly emerged objects;
determining moving objects from the video data;
classifying the moving objects from the video data;
tracking the moving objects from the video data, wherein tracking comprises receiving as input an instance of one object at one point in time and calculating its trajectory and shape over time, and for each new video frame attempting to match foreground objects with existing objects tracked in prior iterations of the iterative process;
wherein tracking the moving objects comprises tracking moving objects from a plurality of dissimilar sources to allow the video data from the plurality of dissimilar sources to be analyzed without dependence on a source of any of the video data; and
a data analytics module configured to receive processed video data from the plurality of video analysis workers and output human readable information, wherein the human readable information comprises virtual turnstile information.

16. The system of claim 15, wherein the data analytics module is further configured to access external data sources, including weather data sources, and event information sources.

17. The system of claim 15, further comprising at least one user interface configured to provide human readable information to a user wherein the user interface outputs human readable information to a computing device with processing capability, communication capability, and display capability, including personal computers and mobile devices.

18. The system of claim 15, wherein the special purpose processors determine moving objects from the video data, and wherein the determining comprises:
   the special purpose processors classifying the moving objects from the video data; and
   the special purpose processors tracking the moving objects from the video data.

* * * * *